US010256006B1

(12) United States Patent
Tuan et al.

(10) Patent No.: US 10,256,006 B1
(45) Date of Patent: *Apr. 9, 2019

(54) ELECTRICALLY CONDUCTIVE CONCRETE MIX FOR ELECTROMAGNETIC (EM) GROUND PLANE

(71) Applicant: NUtech Ventures, Lincoln, NE (US)

(72) Inventors: Christopher Tuan, Omaha, NE (US); Lim Nguyen, Bellevue, NE (US)

(73) Assignee: NUtech Ventures, Lincoln, NE (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/381,876

(22) Filed: Dec. 16, 2016

Related U.S. Application Data

(60) Provisional application No. 62/294,120, filed on Feb. 11, 2016, provisional application No. 62/269,508, filed on Dec. 18, 2015.

(51) Int. Cl.
| | | |
|---|---|---|
| *H01B 1/16* | (2006.01) | |
| *C04B 14/02* | (2006.01) | |
| *C04B 14/48* | (2006.01) | |
| *C04B 28/04* | (2006.01) | |
| *C04B 111/00* | (2006.01) | |
| *C04B 111/94* | (2006.01) | |

(52) U.S. Cl.
CPC .............. *H01B 1/16* (2013.01); *C04B 14/022* (2013.01); *C04B 14/48* (2013.01); *C04B 28/04* (2013.01); *C04B 2111/00844* (2013.01); *C04B 2111/94* (2013.01)

(58) Field of Classification Search
CPC ................................................. C04B 14/022
See application file for complete search history.

(56) References Cited

U.S. PATENT DOCUMENTS

| | | | |
|---|---|---|---|
| 2,334,355 A | 11/1943 | Russell | |
| 2,726,339 A * | 12/1955 | Borst ...................... G21F 1/042 | |
| | | | 106/640 |
| 2,868,659 A | 1/1959 | Scripture, Jr. | |
| 3,207,705 A | 9/1965 | Hall | |
| 3,309,196 A | 3/1967 | Kaneko | |
| 3,377,462 A | 4/1968 | Pferschy | |
| 3,475,304 A | 10/1969 | Currey | |
| 3,721,058 A | 3/1973 | Dewey, Jr. et al. | |
| 4,656,313 A | 4/1987 | Moore et al. | |
| 4,811,770 A * | 3/1989 | Rapp ........................ E04B 5/36 | |
| | | | 52/309.12 |
| 5,312,526 A | 5/1994 | Miller | |
| 5,346,547 A | 9/1994 | McCormack | |
| 5,392,580 A | 2/1995 | Baumann | |
| 5,422,174 A | 6/1995 | Shintani et al. | |
| 6,214,454 B1 | 4/2001 | Kanda et al. | |
| 6,461,424 B1 | 10/2002 | Ramme et al. | |
| 6,503,318 B2 | 1/2003 | Pye et al. | |
| 6,821,336 B1 | 11/2004 | Ramme et al. | |
| 6,825,444 B1 | 11/2004 | Tuan et al. | |
| 7,578,881 B2 | 8/2009 | Ramme | |
| 8,067,084 B2 | 11/2011 | Yoshikawa et al. | |
| 8,617,309 B1 | 12/2013 | Carney et al. | |
| 8,968,461 B1 * | 3/2015 | Tuan ...................... C04B 28/04 | |
| | | | 106/472 |
| 9,278,887 B1 | 3/2016 | Tuan et al. | |
| 9,681,592 B2 | 6/2017 | Tuan et al. | |
| 2002/0017466 A1 | 2/2002 | Petrenko | |
| 2002/0162484 A1 | 11/2002 | Ramme et al. | |
| 2007/0039277 A1 | 2/2007 | Mossbeck | |
| 2007/0186824 A1 | 8/2007 | Takahashi et al. | |
| 2007/0246857 A1 * | 10/2007 | Kurtis ..................... B28B 1/525 | |
| | | | 264/236 |
| 2012/0227630 A1 | 9/2012 | Gray | |
| 2012/0324811 A1 | 12/2012 | Kawase et al. | |
| 2016/0234977 A1 | 8/2016 | Tuan et al. | |

FOREIGN PATENT DOCUMENTS

| | | |
|---|---|---|
| CN | 1552657 A | 12/2004 |
| CN | 101030454 A | 9/2007 |
| CN | 102219447 A | 10/2011 |
| CN | 102444070 A | 5/2012 |
| CN | 102674881 A | 9/2012 |
| CN | 102869132 A | 1/2013 |
| CN | 102875090 A | 1/2013 |
| JP | H06-240843 A | 8/1994 |
| JP | H07157356 A | 6/1995 |
| WO | WO-0240799 A1 | 5/2002 |
| WO | WO-2010059169 A1 | 5/2010 |
| WO | WO-2013096990 A1 | 7/2013 |

(Continued)

OTHER PUBLICATIONS

Cao, Jingyao et al., "Use of fly ash as an admixture for electromagnetic interference shielding", Cement and Concrete Research, 34 (2004), pp. 1889-1892.

Yehia, S. et al., "Conductive Concrete for Electromagnetic Shielding Applications", Advances in Civil Engineering Materials, vol. 3, No. 1, Published May 2, 2014 (Abstract Only).

Zhang, X. et al., "Electromagnetic shielding and absorption properties of fiber reinforced cementitious composites", Wuhan Univ. Technology, Material Science Edit. (2012) 27:172 doi: 10.1007/s11595-012-0430-6 (Abstract Only).

(Continued)

*Primary Examiner* — Peter F Godenschwager
(74) *Attorney, Agent, or Firm* — Harness, Dickey & Pierce, P.L.C.

(57) ABSTRACT

Conductive concrete mixtures are described that are configured to reflect, for instance, EM waves propagating from an EM pulser onto the conductive concrete mixture forming a ground plane, rather than absorb or dissipate the electromagnetic energy. The conductive concrete mixtures include cement, aggregate, water, metallic conductive material, and conductive carbon particles.

7 Claims, 4 Drawing Sheets

(56) References Cited

FOREIGN PATENT DOCUMENTS

WO     WO-2014184146 A1     11/2014
WO     WO-2014210007 A1     12/2014

OTHER PUBLICATIONS

English Translation of Office Action dated Jan. 25, 2017 from Chinese Patent Office for Chinese Patent Application No. 201480046827.4; 7 pages.
Notification of Transmittal of the International Search Report and the Written Opinion of the International Searching Authority for PCT Application No. PCT/US2014/043875, dated Oct. 14, 2014.
Chinese Office Action for Application No. 201480046827.4 dated Oct. 10, 2017; 9 pages.
Construction Methods and Skills of Concrete Engineering Site Construction dated May 31, 2009; 10 pages.
Calculation of Shielding Effectiveness of Metal Wire Mesh of Cable dated Feb. 28, 2010; 5 pages.
Electromagnetic shielding concrete and developing trend dated Oct. 31, 2004; 4 pages.
International Search Report and Written Opinion for PCT Application No. PCT/US2017/026415, dated Jul. 11, 2017, 14 pages.

\* cited by examiner

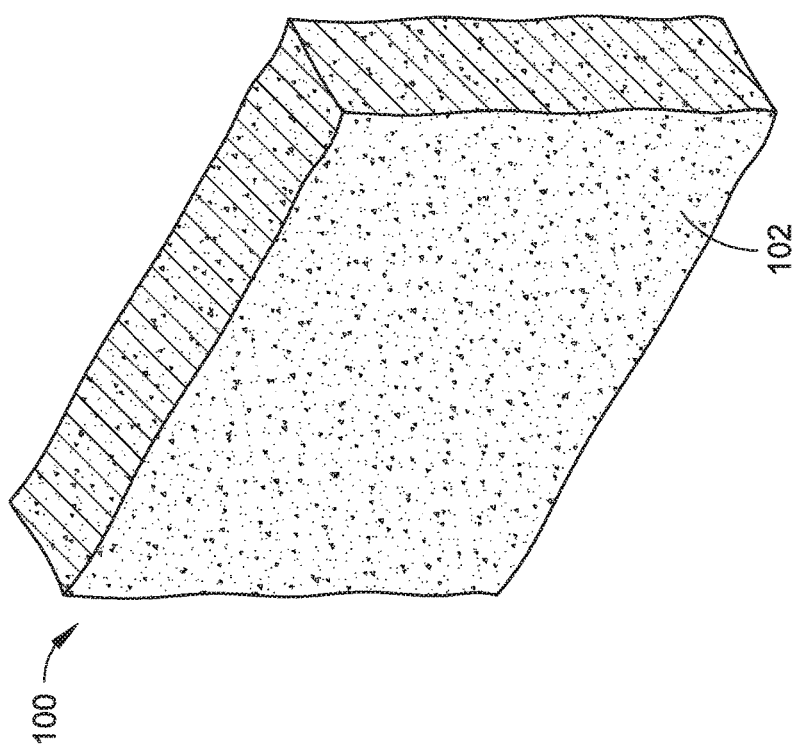

US 10,256,006 B1

ELECTRICALLY CONDUCTIVE CONCRETE MIX FOR ELECTROMAGNETIC (EM) GROUND PLANE

BACKGROUND

Antennas can transmit electromagnetic (EM) energy, via signals, waves, or pulses, through conversion of electrical energy, whereas antennas can also receive electromagnetic energy for subsequent conversion to electrical energy, such as for data transmission and reception. A ground plane is an electrically conducting surface that can facilitate transmission or reception of electromagnetic energy by an antenna by providing a conductive surface against which the electromagnetic energy can propagate and be guided efficiently. The function of the ground plane can be performed by a terrestrial body (e.g., the Earth), or through fabricated materials, which can add cost and complexity to the antenna design.

SUMMARY

The ground planes used for EM hardness testing have been conventionally constructed with metal panels, rebar mesh, and/or wire mesh. This type of construction for a relatively large testing area will become cost prohibitive. A cost-effective alternative is to cast an overlay or a surface layer conductive concrete over the original pavement, to form an electrically conductive and EM reflective paved surface. This conductive concrete can also be used to mitigate the "dead zones" in a building where poor or no signal was received by mobile electronic devices.

Conventional concrete is not electrically conductive. The electrical resistivity of normal weight concrete ranges between 6.54 and 11 kΩ-m. Conductive concrete may be defined as a cement-based admixture, which contains a certain amount of electrically conductive components to attain a stable electrical conductivity to enable conduction of electricity through the concrete. Conductive concrete mixtures for ground plane formations (e.g., EM pulser ground planes) are described that are configured to provide reflective properties (e.g., not absorptive properties) to the ground plane, for instance, to reflect EM waves propagating from an EM source (e.g., an EM pulser antenna) onto the conductive concrete mixture forming the ground plane without significantly reducing the intensity of the EM waves or slow down the guided waves. The conductive concrete mixtures include cement, aggregate, water, metallic conductive material, and conductive carbon particles. The conductive concrete mixtures can be formed into slabs suitable for EM ground planes. The metallic conductive material may include steel fibers, steel wool, steel shavings, or the like. The conductive concrete mixture may also include graphite powder, silica fume, and/or other supplementary cementitious materials (SCM) such as fly ash, calcined clay, and ground granular blast furnace slag (GGBFS). The conductive carbon particles may comprise from about ten to twenty-five percent (10-25%) of the conductive concrete mixture by weight. The purity of the carbon particles and powder may vary from 50% to 100%. In implementations, the conductive carbon particles may comprise from about twelve to eighteen percent (12-18%) of the conductive concrete mixture by weight to provide the reflective properties associated with a ground plane.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 1A is an isometric view illustrating a conductive concrete mixture slab structure that can be used for structural walls in a room for enhancing RF signals reception in accordance with example embodiments of the present disclosure.

DETAILED DESCRIPTION

Overview

Figure 1B:
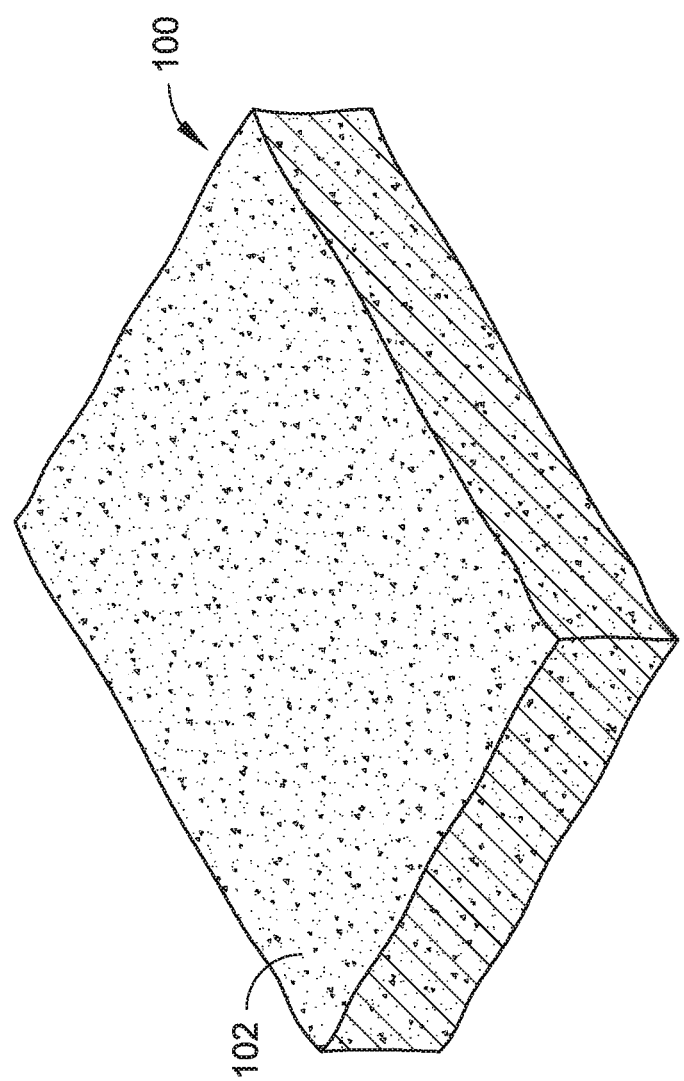
FIG. 1B is an isometric view illustrating a conductive concrete mixture slab structure that is a ground plane for an electromagnetic (EM) pulser in accordance with example embodiments of the present disclosure.

Conventional concrete is not electrically conductive for practical purposes. For instance, the electrical resistivity of normal weight concrete ranges between 6.54 and 11 kΩ-m. A hydrated concrete consists of pore solution and solids, including aggregates, hydrates and unhydrated cement. The electric resistivity of the pore solution in cement paste is about 0.25-0.35 Ω-m. Most aggregates (e.g., limestone) used in concrete, with electrical resistivity ranges between $3 \times 10^2$ and $1.5 \times 10^3$ Ω-m, are essentially not conductive. Conductive concrete may be defined as a cement-based admixture, which contains a certain amount of electrically conductive components to attain a stable and relatively high electrical conductivity. Due to the electrical resistance in the conductive concrete mixture, heat is generated when connected to an electrical power source. Besides radiant heating, other applications currently incorporating conductive concrete include electromagnetic shielding, often required in the design and construction of facilities and equipment to protect electrical systems or electronic components; radiation shielding in the nuclear industry; anti-static flooring in the integrated circuits fabrication or electronic instrumentation industry and hospitals; and cathodic protection of steel reinforcement in concrete structures. In these applications, such as electrical grounding and electromagnetic wave shielding, the conductive concrete may not be energized.

Electromagnetic testing facilities, such as electromagnetic pulse simulators (e.g., EM pulser), semi-anechoic chambers, open area test sites, antenna ranges, or other facilities incorporating antennas can utilize ground planes to reflect electromagnetic waves generated by an antenna to redirect the waves. For example, high power electromagnetic pulse simulators generate electromagnetic waves or pulses to propagate against (directly or indirectly) the materials or structures to be tested, where the electromagnetic pulser devices can utilize a ground plane structure to reflect the electromagnetic waves generated from the pulser antenna. While metal structures (e.g., planar metal panels, plates, mesh, etc.) can serve as ground planes, the costs associated with fabricating, transporting, and maneuvering such structures into service can cause their use to be infeasible.

Accordingly, the present disclosure is directed to conductive concrete building materials that provide reflective characteristics to facilitate usage as a ground plane, such as a ground plane for an EM pulser. The present disclosure is also directed to methods for preparing the conductive concrete building materials for various applications, such as a ground plane for an EM pulser. Conductive concrete materials of the present disclosure provide a reflective material to reflect the electromagnetic waves to facilitate operation of the EM pulser. Additionally, use of the conductive concrete material may provide a more cost-effective building option (e.g., instead of constructing a ground plane substantially from metallic panels and meshes).

In implementations, the conductive concrete mixture may include one or more conductive materials configured to furnish electrical conductivity to the concrete. The conductive material serves to provide reflective characteristics, such as those suitable for ground planes. For example, the conductive concrete mixture may include at least substantially uniformly distributed conductive materials, which may include metallic and possibly non-metallic conductive materials, such as metal and/or carbon fibers or particles. For the purposes of the present disclosure, a conductive concrete mixture may be defined as a cement-based admixture containing electrically conductive components that furnish a relatively high electrical conductivity to the concrete (e.g., with respect to the electrical conductivity of typical concrete). The conductive concrete mixture may also include conductive carbon particles, such as carbon powder, and so forth, which may furnish better electrically conductive paths between portions of the conductive material, achieving, for instance, a more effective reflective-wire-mesh structure in the concrete. In implementations, the conductive carbon particles can include carbon particles present in varying ratios. The purity of the carbon particles and powder may also vary from 50% to 100%. For example, the conductive carbon particles can include one or more of carbon particles, carbon powder, coke breeze, or the like.

In implementations, the conductive concrete mixture includes a metallic conductive material. For example, the metallic conductive material may be a steel material, such as one inch (1 in.) long steel fibers, one and one-half inch (1.5 in.) long steel fibers, fine steel fibers, steel wool fibers, steel powder, and so forth. In a particular instance, low-carbon steel fibers having aspect ratios from about eighteen to fifty-three (18-53) can be used to form the conductive concrete mixture. These fibers may be rectangular in shape and may have a deformed or corrugated surface to aid in bonding with the concrete material. However, steel fibers are provided by way of example only and are not meant to be restrictive of the present disclosure. Thus, other metallic conductive materials may also be utilized, including metal particles such as steel shavings, which may have varying diameters. Further, the conductive concrete mixture may include conductive aggregates, such as iron ore and/or slag. In some instances, copper-rich aggregates can be used. It should be noted that using conductive aggregates may reduce the amount of conductive fibers necessary to maintain stable electrical conductivity. Additionally, a chemical admixture may be added to the aggregate to enhance electrical conductivity and reduce the amount of conductive fibers. Further, combinations of the above-provided conductive materials may be utilized in the conductive concrete mixture, where usage of such components can depend on various considerations, including but not limited to, availability, cost, and so forth.

Example Implementations

Figure 1C:
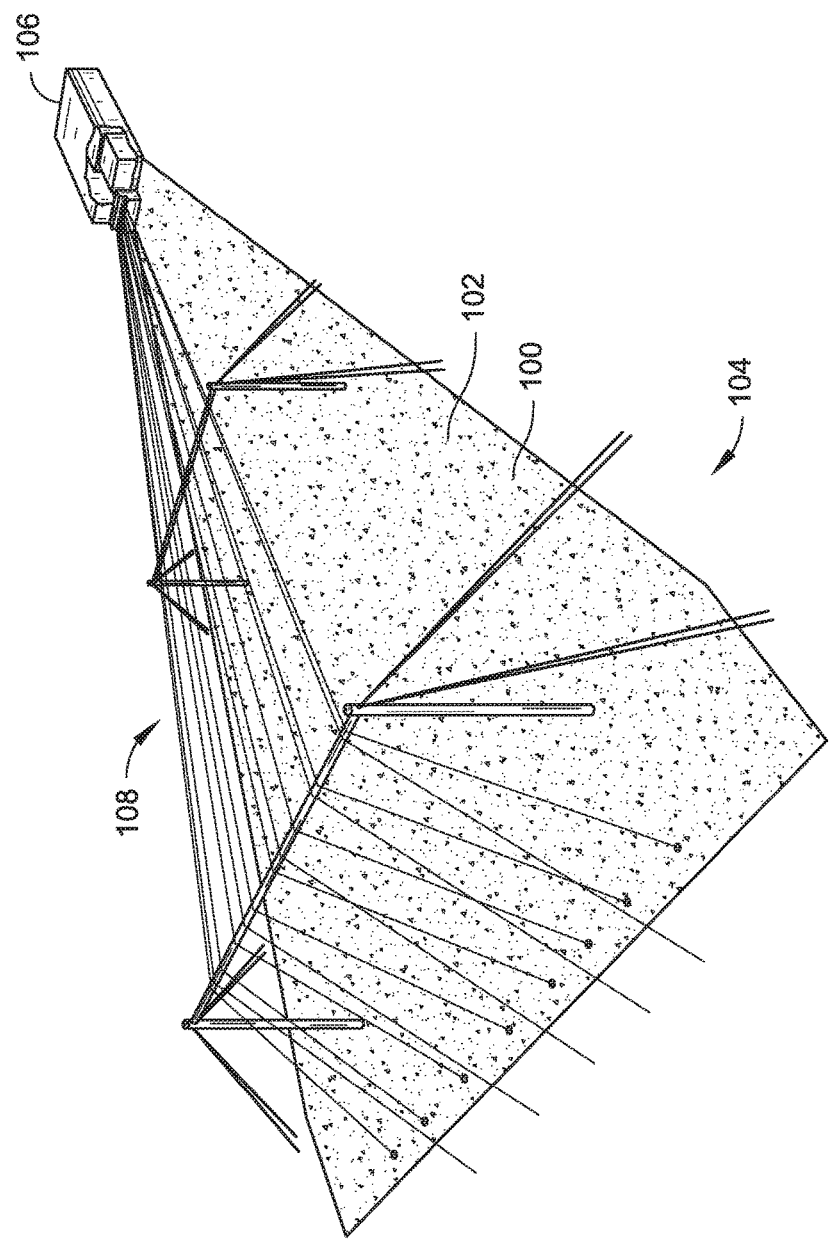
FIG. 1C is an environmental view illustrating a conductive concrete mixture slab structure that is a ground plane for an electromagnetic (EM) pulser, in accordance with example embodiments of the present disclosure.

Referring generally to FIGS. 1A through 1C, example implementations directed to reflective and conductive concrete building materials that can be fabricated as a ground plane (e.g., a ground plane for an EM pulser) will now be provided. An electromagnetic pulse (EMP) simulator (EM pulser 104) can include an EM pulse source (EM pulser assembly 106) and at least one slab structure 100 including a conductive concrete mixture. Additionally, the electromagnetic pulse (EMP) simulator 104 can include an overhead wire antenna 108 that forms a conical transmission line antenna structure to simulate the EMP environment for testing the vulnerability of electronic systems, as an example, in large aircraft to a high-altitude EMP (HEMP) event. A conical transmission line antenna comprises a bottom ground plane structure 100 and an overhead antenna structure 108 extending from the antenna apex where a high voltage pulse source from the EM pulser assembly 106 is coupled into the antenna generating a preferential spherical EM wave inside the antenna testing volume. It can be understood that the electrically conductive concrete slab structure 100 may be important to the successful EM pulser operation. One cubic yard of an exemplary conductive concrete mixture 100 in accordance with the present disclosure may be formulated as follows:

| Material | Pounds | Percent (Wt. %) |
| --- | --- | --- |
| Type I cement | 707 | 16.8% |
| Silica fume | 41 | 0.97% |
| Crushed Limestone (½" maximum aggregate size) | 1125 | 26.72% |
| Coarse Sand (ASTM C33) | 1023 | 24.29% |
| Carbon particles (10 mm max particle size) | 509 | 12.08% |
| Carbon powder (0.15 mm max particle size) | 121 | 2.88% |
| Water | 420 | 9.9% |
| Steel fiber (1 in.) | 122 | 2.89% |
| Steel fiber (1.5 in.) | 100 | 2.37% |
| Steel fiber (fine, wool)/steel powder | 75 | 1.78% |

In implementations, the purity of the conductive carbon particles and powder is at least eighty percent (80%). It should be noted that the specific amounts described above are provided by way of example only and are not meant to be restrictive of the present disclosure. Thus, other amounts of material and/or additional materials may be used for a specified conductive concrete mixture 102 in accordance with the present disclosure. For example, the conductive concrete mixtures 102 can also include, but are not limited to, one or more of a retarding mixture (e.g., an ASTM C494 Type D admixture, hydration stabilizer, etc.) and a super-plasticizer (e.g., an ASTM C494 Type A and F admixture, an ASTM C1017 Type I admixture, a water-reducing admixture, etc.).

In implementations, cement may comprise from about twelve to eighteen percent (12-18%) of the conductive concrete mixture 102 by weight; silica fume may comprise from about one-tenth to one and one-tenths percent (0.1-1.1%) of the conductive concrete mixture 102 by weight; slag may comprise from about zero to six percent (0-6%) of the conductive concrete mixture 102; aggregate may comprise from about to twenty to thirty percent (20-30%) of the conductive concrete mixture 102 by weight; sand (e.g., coarse sand) may comprise from about twenty to twenty-five percent (20-25%) of the conductive concrete mixture 102 by weight; conductive carbon material (e.g., carbon particles, carbon powder, and coke breeze, which can be present in varying ratios) may comprise from about ten to twenty percent (10-20%) of the conductive concrete mixture 102 by weight; water may comprise from about five to fifteen percent (5-15%) of the conductive concrete mixture 102 by weight; and additive steel portions (e.g., steel fibers, steel wool, steel shavings, which can be present in varying ratios) may comprise from about one-tenth to fifteen percent (0.1-15%) of the conductive concrete mixture 102 by weight.

Further, the amounts of materials having different particle sizes may vary as well. For example, in implementations, conductive carbon particles may comprise from about zero to fifteen percent (0-15%) of the conductive concrete mixture 102 by weight; conductive carbon powder may comprise from about zero to three percent (0-3%) of the conductive concrete mixture 102 by weight; coke breeze may comprise from about five to 20 percent (5-20%) of the conductive concrete mixture 102 by weight; one inch (1 in.) long steel fibers may comprise from about two and one-half to four percent (2.5-4%) of the conductive concrete mixture 102 by weight; one-half inch (1.5 in.) long steel fibers may comprise from about one to four percent (1-4%) of the conductive concrete mixture 102 by weight; and fine steel fiber (e.g., steel powder, steel wool, steel shavings, etc.) may comprise from about one and one-half to four and one-half percent (1.5-4.5%) of the conductive concrete mixture 102 by weight.

Further example implementations directed to reflective and conductive concrete building materials are provided herein below, with the conductive concrete mixtures 102 being formed as slab structures 100 (e.g., a vertical slab, i.e. a wall, as illustrated in FIG. 1A, a horizontal slab, i.e. pavement, as illustrated in FIG. 1B), where the slab structure 100 can include a slab of conductive concrete mixture 102. The slab of concrete mixture can include a flat piece of the conductive concrete mixture 102, which may include a variety of shapes (e.g., rectangular, square, circular, and so forth).

Example 1

| Material | Pounds | Wt. % |
| --- | --- | --- |
| Type I cement | 185 | 13.81 |
| Silica fume | 7 | 0.49 |
| Slag | 70 | 5.23 |
| Crushed Limestone (½" max agg. size) | 347 | 25.87 |
| Coarse Sand (ASTM C33) | 315 | 23.52 |
| Carbon Particles (10 mm max part. size) | 157 | 11.70 |
| Carbon Powder (0.15 mm max part. size) | 37 | 2.79 |
| Water | 130 | 9.70 |
| Steel Fibers (1 in.) | 37 | 2.79 |
| Steel Fibers (1.5 in.) | 30 | 2.24 |
| Steel Wool | 25 | 1.87 |
| | 1339.44 | 100.00 |

Example 2

| Material | Pounds | Wt. % |
| --- | --- | --- |
| Type I cement | 10.73 | 13.58 |
| Silica fume | 0.40 | 0.50 |
| Slag | 4.24 | 5.36 |
| Crushed Limestone (½" max. agg. size) | 19.60 | 24.81 |
| Coarse Sand (ASTM C33) | 16.94 | 21.45 |
| Coke Breeze | 11.30 | 14.30 |
| Water | 9.19 | 11.63 |
| Steel Fibers (1 in.) | 2.09 | 2.65 |
| Steel Fibers (1.5 in.) | 1.69 | 2.14 |
| Steel Shavings | 2.82 | 3.57 |
| | 79.00 | 100.00 |

Example 3

| Material | Pounds | Wt. % |
| --- | --- | --- |
| Type I cement | 47.96 | 15.82 |
| Silica fume | 1.53 | 0.50 |
| Slag | 7.63 | 2.52 |
| Crushed Limestone (½" max. agg. size) | 75.64 | 24.95 |
| Coarse Sand (ASTM C33) | 67.57 | 22.29 |
| Coke Breeze | 42.29 | 13.95 |
| Water | 38.34 | 12.65 |
| Steel Fibers (1 in.) | 8.07 | 2.66 |
| Steel Fibers (1.5 in.) | 6.54 | 2.16 |
| Steel Shavings | 7.63 | 2.52 |
| | 303.20 | 100.00 |

It should be noted that the specific amounts described above are provided by way of example only and are not meant to be restrictive of the present disclosure. Thus, other amounts of material and/or additional materials may be used to provide a specified conductive concrete mixture in accordance with the present disclosure.

Example Fabrication Method

Figure 2:
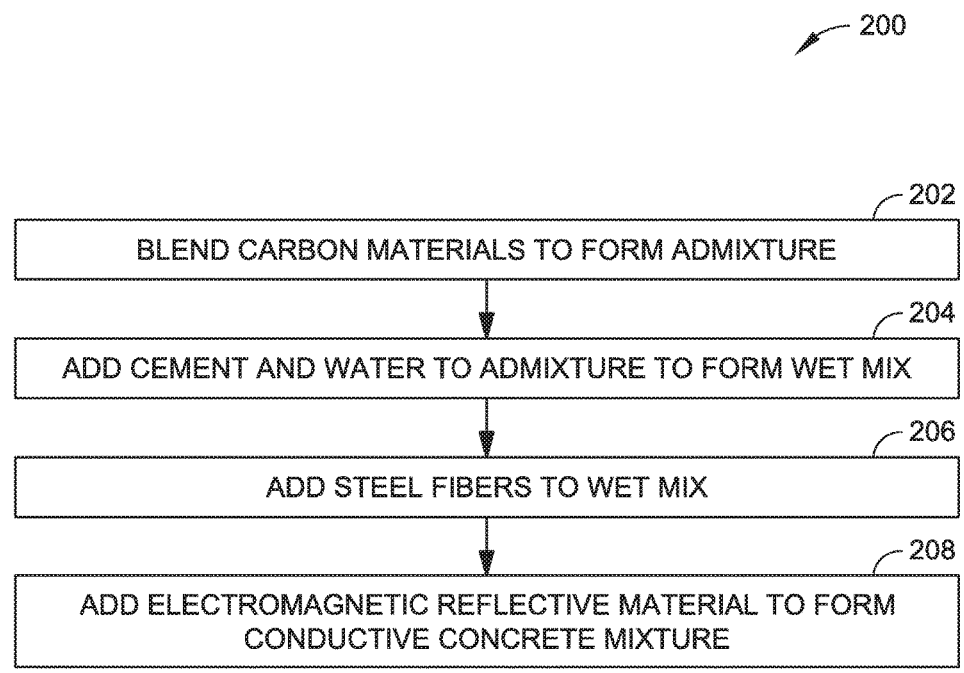
FIG. 2 is a flow diagram illustrating a method for making a conductive concrete mixture in accordance with example implementations of the present disclosure.

Referring now to FIG. 2, example techniques for making a conductive concrete mixture are described. FIG. 2 depicts a process 200, in an example implementation, for making a conductive concrete mixture using, for instance, metallic conductive material and an electromagnetic reflective material including conductive carbon particles, as described above.

An example method for fabrication of a conductive concrete mixture structure in accordance with an example implementation of the present disclosure can include a dry mix process, a wet mix process, a steel introduction process, a finishing process, and an application process.

In the process 200 illustrated, carbon materials are blended to form an admixture (Block 202). The dry mix process generally includes mixing and/or blending carbon materials (e.g., carbon particles, carbon powder, coke breeze, etc.), crushed limestone, coarse sand, steel powder, and silica fume. For example, the dry mix process can be facilitated by a rotating drum, a drum mixer, a cement truck mixer, or the like. In an implementation, the dry mix process includes mixing the components for about ten minutes.

Then, cement and water are added to the admixture to form a wet mix (Block 204). The wet mix process generally includes introducing cement and water to the dry admixture and mixing, for example in a rotating drum and/or other type of mixer. In some implementations, the wet mix process can also include adding a retarder admixture, a chemical admixture, and/or a superplasticizer.

Next, steel fibers are added to the admixture (Block 206). The steel introduction process generally includes including the steel fibers (e.g., the 1 in. fibers, the 1.5 in. fibers, etc.) to the wet mixture. In an implementation, the steel fibers are introduced via a conveyor belt and chute assembly, with the fibers spread evenly over the belt surface. In an implementation, differing fiber sizes are alternatively introduced to the belt, which can avoid flocculation or balling of the steel fibers and jamming at the chute.

Then, an electromagnetic reflective material including conductive carbon particles are added to form a conductive concrete mixture (Block 208). Additionally, an electromagnetic reflective material including conductive carbon particles can be added to the mixture. In this embodiment, the conductive carbon particles may be present in an amount from ten to twenty-five percent of the concrete mixture by weight. Additionally, the conductive carbon particles may include carbon particles, carbon powder, coke breeze, or the like. The finishing process generally includes adding a superplasticizer to the mixture having the steel fibers. In an implementation, the finishing process includes determining a slump of the concrete prior to introduction of the superplasticizer. In an implementation, a slump of the conductive concrete mixture is from about five and one-half inches to about seven and one-half inches (5.5 in. to 7.5 in.), or in another implementation, from about six inches to about seven inches (6 in. to 7 in.). The amount of superplasticizer to add to the concrete mixture generally depends on the amount of concrete formed. For example, for a nine cubic foot batch, approximately 30 to 45 ounces of superplasticizer (e.g., high range water reducer) may be utilized. The upper bound of added superplasticizer has been found to relate to when the steel fibers would sink to the bottom of the conductive concrete mixture 102 (which can have a thin or soupy quality to the concrete mixture), rather than being distributed throughout the mixture.

The application process generally includes dispensing the conductive concrete mixture 102 into one or more forms to fabricate a slab structure 100 outlined by the one or more forms. In implementations, vibration can be utilized to consolidate the conductive concrete mixture 102 in remote spaces, between steel reinforcing bars, or the like. In specific implementations, the conductive concrete mixture 102 and/or the slab structure 100 can be utilized to form or fabricate a ground plane for an electromagnetic (EM) pulser assembly.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A slab structure, comprising:
   a slab of conductive concrete mixture, the conductive concrete mixture including
   cement;
   aggregate;
   water;
   metallic conductive material; and
   an electromagnetic reflective material including electrically conductive carbon particles, wherein the electrically conductive carbon particles are present in an amount from ten to twenty-five percent of the conductive concrete mixture by weight.

2. The slab structure of claim 1, wherein the cement includes a Type I cement.

3. The slab structure of claim 1, wherein the aggregate includes iron ore.

4. The slab structure of claim 1, wherein the aggregate includes copper.

5. The slab structure of claim 1, wherein the metallic conductive material includes at least one of steel fibers or steel shavings.

6. The slab structure of claim 1, wherein the electrically conductive carbon particles includes carbon powder.

7. The slab structure of claim 1, wherein the conductive concrete mixture includes a superplasticizer.

\* \* \* \* \*